(12) United States Patent
Kim et al.

(10) Patent No.: US 8,396,160 B2
(45) Date of Patent: Mar. 12, 2013

(54) METHOD AND APPARATUS FOR TRANSMITTING SIGNALS

(75) Inventors: Ki Hwan Kim, Goyang-si (KR); Yeong Hyeon Kwon, Daejeon (KR); Jae Hoon Chung, Yongin-si (KR); So Yeon Kim, Goyang-si (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 13/122,462

(22) PCT Filed: Oct. 15, 2009

(86) PCT No.: PCT/KR2009/005933
§ 371 (c)(1),
(2), (4) Date: Apr. 4, 2011

(87) PCT Pub. No.: WO2010/064788
PCT Pub. Date: Jun. 10, 2010

(65) Prior Publication Data
US 2011/0188594 A1    Aug. 4, 2011

Related U.S. Application Data

(60) Provisional application No. 61/119,346, filed on Dec. 2, 2008, provisional application No. 61/119,710, filed on Dec. 3, 2008.

(30) Foreign Application Priority Data

Jun. 11, 2009   (KR) ........................ 10-2009-0051912

(51) Int. Cl.
*H04L 27/00*    (2006.01)
(52) U.S. Cl. ........................................................ 375/295
(58) Field of Classification Search .................. 375/295, 375/260, 316
See application file for complete search history.

(56) References Cited

U.S. PATENT DOCUMENTS

| | | |
|---|---|---|
| 2005/0074127 A1 | 4/2005 | Herre et al. |
| 2006/0210001 A1 | 9/2006 | Li et al. |
| 2007/0025466 A1 | 2/2007 | Letounov et al. |
| 2010/0034303 A1* | 2/2010 | Damnjanovic et al. ........ 375/260 |
| 2011/0188594 A1* | 8/2011 | Kim et al. ..................... 375/260 |

* cited by examiner

*Primary Examiner* — Jaison Joseph
(74) *Attorney, Agent, or Firm* — Morgan, Lewis & Bockius LLP (57) ABSTRACT

Disclosed herein is a method for transmitting signals in a wireless communication system, including joint coding one or more signals, separating the joint coded signal by a number of a plurality of channel aggregation used for transmission, respectively allocating the separated signals to the plurality of the channel aggregation, and transmitting the signals, such that a receiver smoothly performs decoding.

15 Claims, 9 Drawing Sheets

METHOD AND APPARATUS FOR TRANSMITTING SIGNALS

The present application is a national stage of PCT International Application No. PCT/KR2009/005933, filed Oct. 15, 2009, and claims the benefit of U.S. Provisional Application Nos. 61/119,346, filed Dec. 2, 2008, and 61/119,710, filed Dec. 3, 2008. The present national stage application also claims the benefit of Korean Patent Application No. 10-2009-0051912, filed Jun. 11, 2009.

TECHNICAL FIELD

The present invention relates to mobile communication technology, and more particularly, to a method and apparatus for transmitting signals in a wireless communication system supporting multiple carriers.

BACKGROUND ART

In a mobile communication system, a user equipment (UE) may receive information from a base station in downlink, and the UE may transmit information in uplink. The information which may be transmitted or received by the UE includes data and a variety of control information. There are various physical channels depending on the kind and use of information transmitted or received by the UE.

Figure 1:
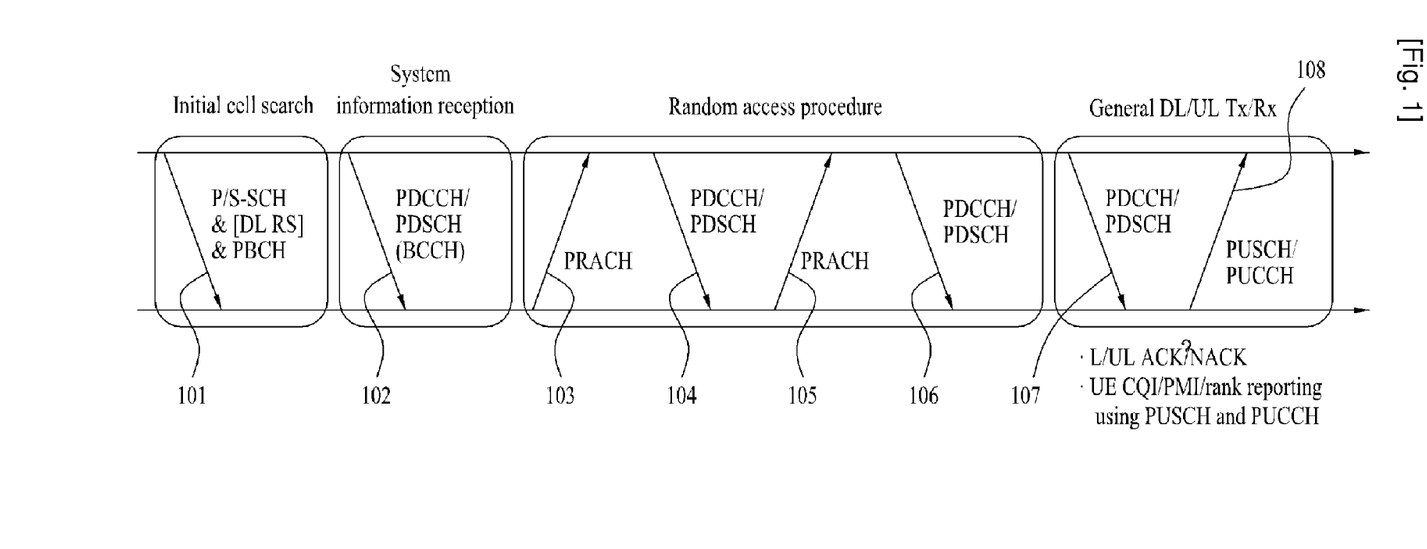
FIG. 1 is a view showing physical channels used for a $3^{rd}$ Generation Partnership Project (3GPP) Long Term Evolution (LTE) system, which is an example of a mobile communication system, and a general signal transmission method using the same.

FIG. 1 is a view showing physical channels used for a $3^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with a base station in step S101. To this end, the UE may receive a Primary Synchronization Channel (P-SCH) and a Secondary Synchronization Channel (S-SCH) from the base station so as to perform synchronization with the base station, and acquire information such as a cell ID. Thereafter, the UE may receive a physical broadcast channel from the base station and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Meanwhile, the UE which does not complete the access to the base station may perform a random access procedure in steps S103 to S106, in order to complete the access to the base station. To this end, the UE may transmit a specific sequence via a Physical Random Access Channel (PRACH) as a preamble (S103), and may receive a message in response to the random access via the PDCCH and the PDSCH corresponding thereto (S104). In contention-based random access except for handover, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure.

Figure 2:
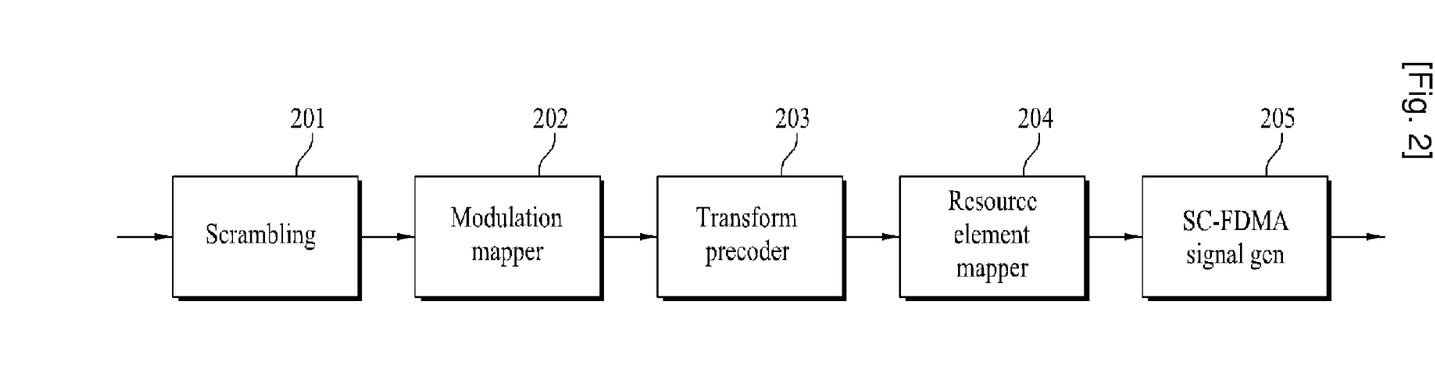
FIG. 2 is a view explaining a signal processing procedure in which a UE transmits an uplink signal.

FIG. 2 is a view explaining a signal processing procedure in which a UE transmits an uplink signal.

In order to transmit the uplink signal, a scrambling module 201 of the UE may scramble a transmitted signal using a UE-specific scrambling signal. The scrambled signal is input to a modulation mapper 202 so as to be modulated into complex symbols using Binary Phase Shift Keying (BPSK), Quadrature Phase Shift Keying (QPSK) or 16-Quadrature amplitude modulation (QAM)/64-QAM scheme according to the kind of the transmitted signal and/or the channel state. Thereafter, the modulated complex symbols are processed by a transform precoder 203, and the processed complex symbols are input to a resource element mapper 204. The resource element mapper 204 may map the complex symbols to time-frequency resource elements used for actual transmission. The signal processed as described above may be transmitted to a base station via an SC-FDMA signal generator 205 and an antenna.

Figure 3:
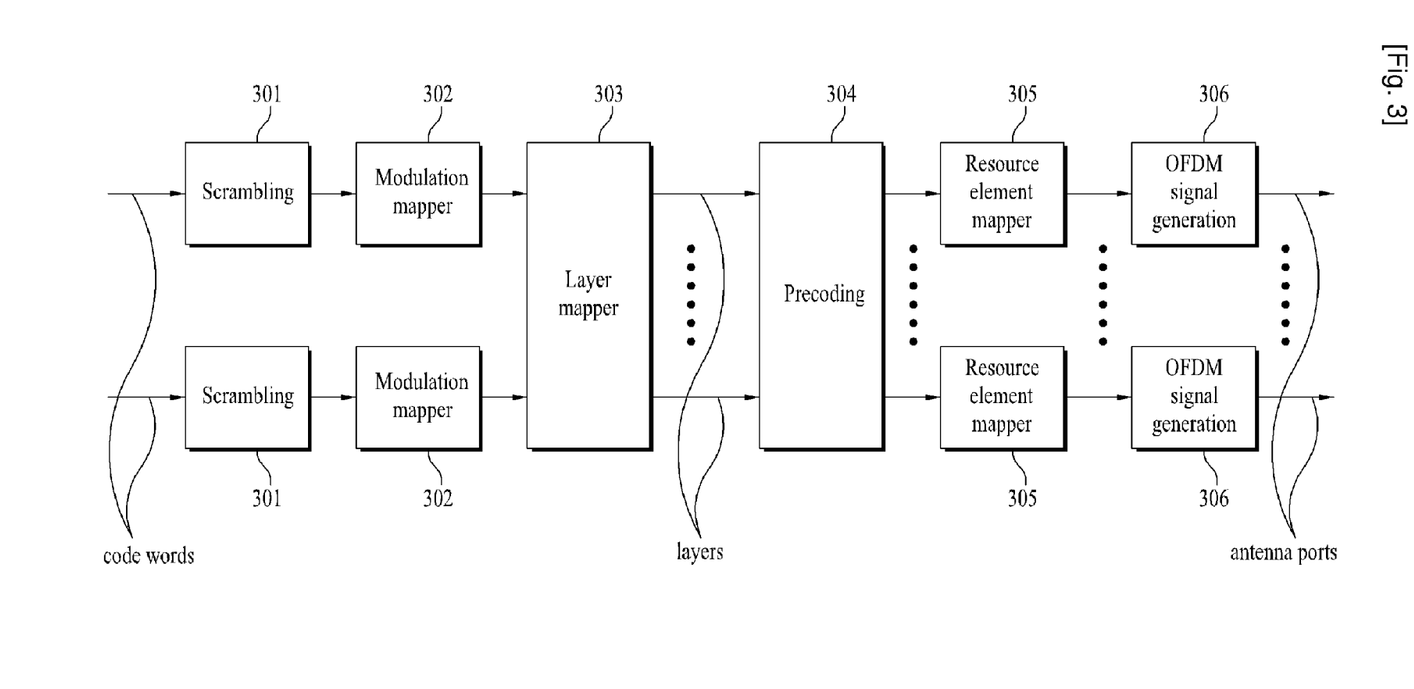
FIG. 3 is a view explaining a signal processing procedure in which a base station transmits a downlink signal.

FIG. 3 is a view explaining a signal processing procedure in which a base station transmits a downlink signal.

In the 3GPP LTE system, the base station may transmit one or more codewords in downlink. Accordingly, one or more codewords may be processed to configure complex symbols by scrambling modules 301 and modulation mappers 302, similar to the uplink transmission of FIG. 2. Thereafter, the complex symbols are mapped to a plurality of layers by a layer mapper 303, and each layer may be multiplied by a predetermined precoding matrix, which is selected according to the channel state, by a precoding module 304 and may be allocated to each transmission antenna. The processed signals which will respectively be transmitted via antennas may be mapped to time-frequency resource elements used for transmission by resource element mappers 305, and may respectively be transmitted via OFDM signal generators 306 and the antennas.

In a mobile communication system, in a case where a UE transmits a signal in uplink, a Peak-to-Average Ratio may be more problematic than the case where a base station transmits a signal in downlink. Accordingly, as described above with reference to FIGS. 2 and 3, the downlink signal transmission uses an OFDMA scheme, but the uplink signal transmission uses an SC-FDMA scheme.

Hereinafter, a procedure for multiplexing data or control information before a signal is transmitted in uplink or downlink will be described with reference to FIGS. 4 and 5.

Figure 4:
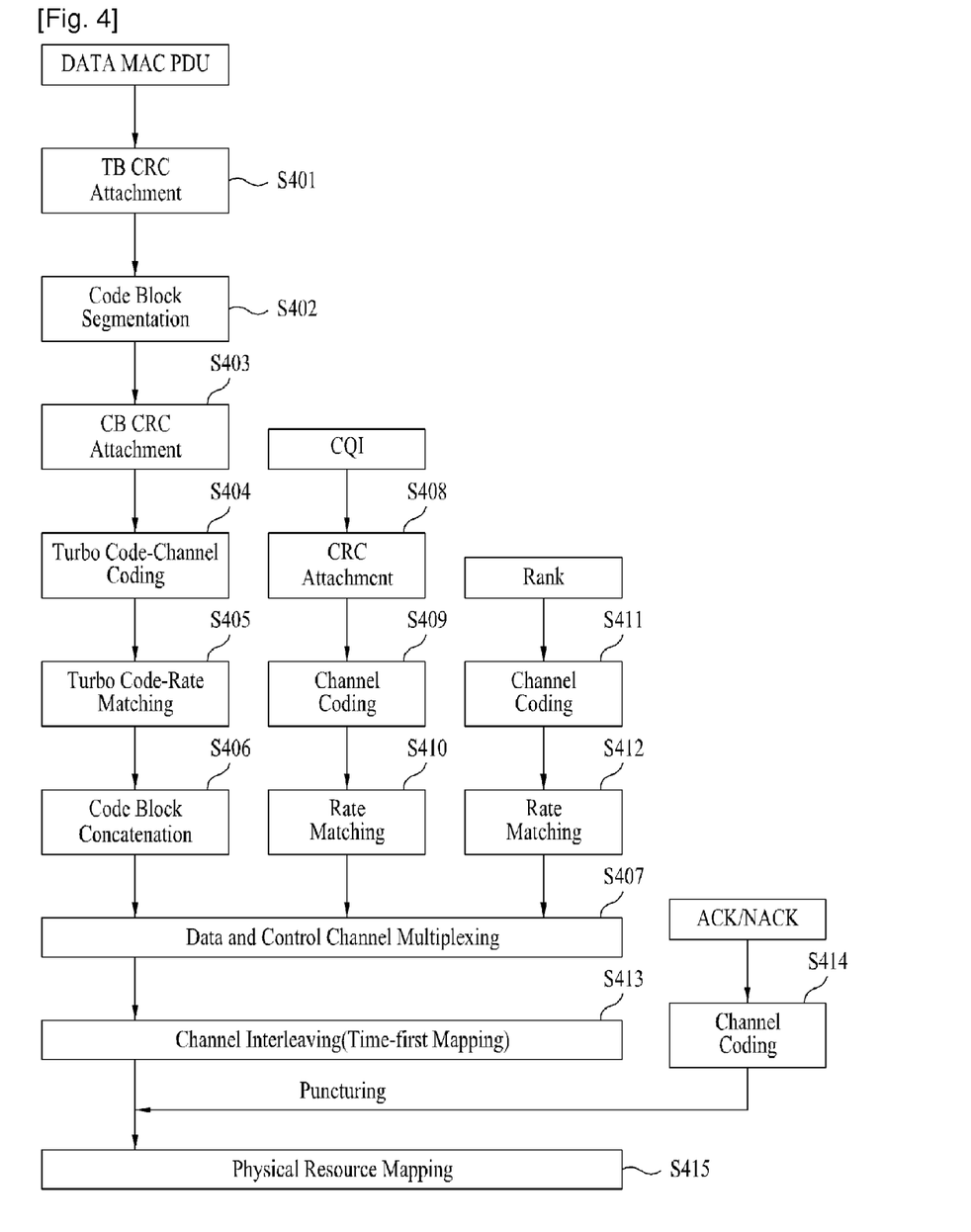
FIG. 4 is a view showing a procedure for multiplexing data and control information which will be transmitted in uplink.

FIG. 4 is a view showing a procedure for multiplexing data and control information which will be transmitted in uplink.

As shown in FIG. 4, with respect to data multiplexed with control information, a Transport Block (TB) Cyclic Redundancy Check (CRC) is attached to a TB to be transmitted in uplink (S401), the TB is segmented into several Code Blocks (CBs) according to the size of the TB (S402), and a CB CRC is attached to the several CBs (S403). Channel coding is performed with respect to the result value (S404). In addition, channel-coded data is subjected to rate matching (S405), CBs are concatenated (S406), and the concatenated CBs are then multiplexed with the control signal (S407).

Meanwhile, with respect to a Channel Quality Information (CQI)/Precoding Matrix Index (PMI), a CRC is attached (S408), and channel coding is then performed independent of the data (S409). The channel-coded CQI/PMI is subjected to rate matching (S410) and is then multiplexed with data (S407).

In addition, with respect to rank information, channel coding is performed independent of the data (S411). The channel-coded rank information is subjected to rate matching (S412) and is then multiplexed with data (S407).

The multiplexed data, CQI/PMI and rank information is subjected to channel interleaving (S413).

In case of ACK/NACK information, channel coding is performed independent of the CQI/PMI and rank information (S414), the ACK/NACK information is inserted into some of the interleaved signals through a puncturing process, and the interleaved signals, into which the ACK/NACK information is inserted, are mapped to physical resources (S415) and are then transmitted in uplink.

Figure 5:
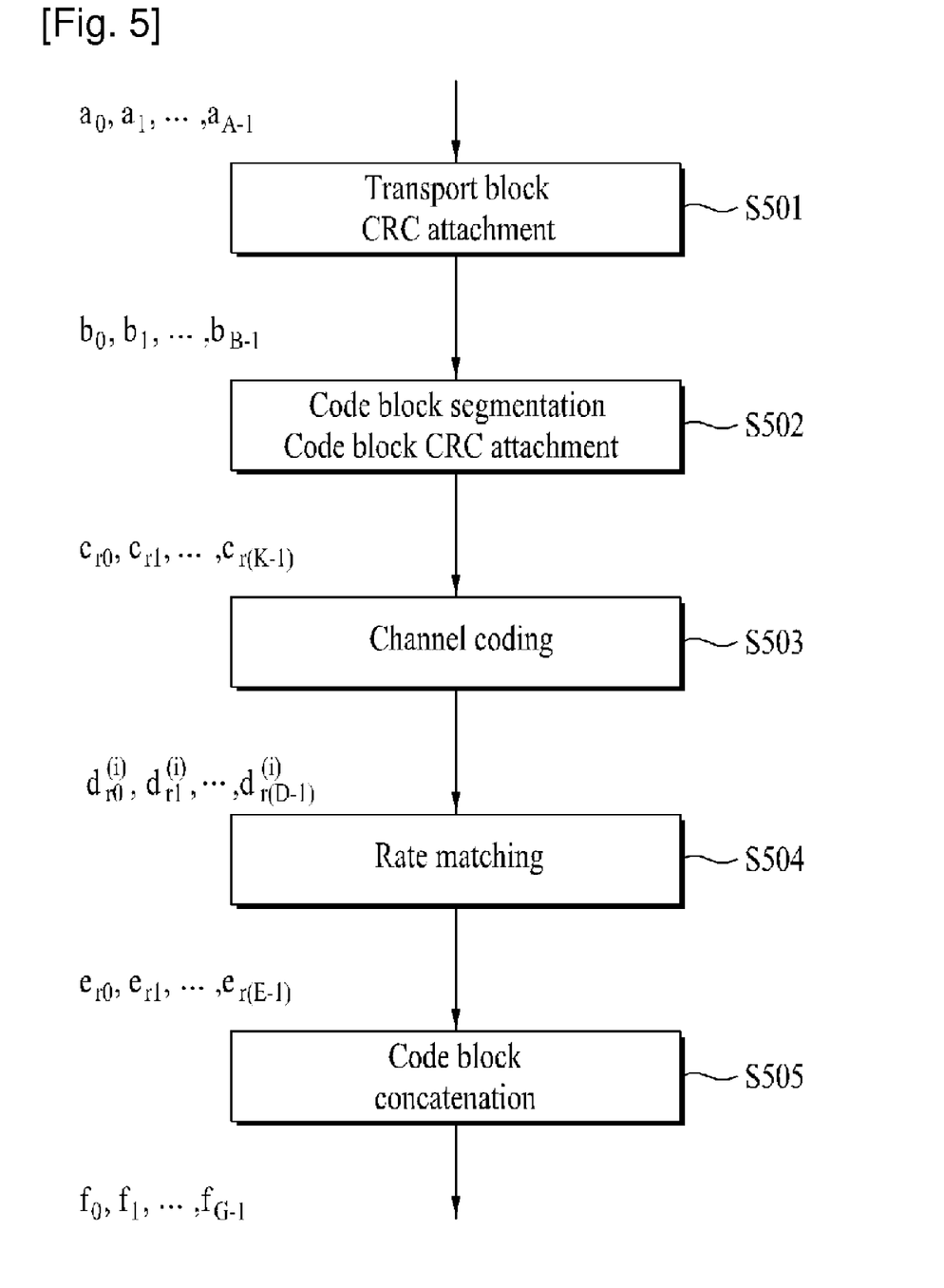
FIG. 5 is a view showing a procedure for multiplexing data which will be transmitted in downlink.

FIG. 5 is a view showing a procedure for multiplexing data which will be transmitted in downlink.

As shown in FIG. 5, with respect to the data, a TB CRC is attached to a TB to be transmitted in downlink as an example of an error detection unit (S501). Thereafter, a TB having a length of at least a specific bit number may be segmented into a plurality of CBs, and a CB CRC may be attached to the CBs as another example of the error detection unit (S502).

In the 3GPP LTE system, the specific bit number may be 6144 bits corresponding to the size of the interleaver during channel coding, and one TB which does not exceed 6144 bits is mapped to one CB without modification. At this time, one TB which is not segmented into CBs may correspond to one codeword. At this time, the procedure may progress to step S503 in a state in which the step of attaching an additional CB CRC to one TB (CB) of FIG. 2 is omitted.

Meanwhile, if the length of one TB exceeds the specific bit number, one TB may be segmented into a plurality of CBs. At this time, each of the segmented CBs may correspond to one codeword. With respect to the plurality of codewords, the above-described channel coding for error correction is performed (S503).

In addition, the channel-coded CB(s) is subjected to rate matching (S504) and the CBs are concatenated (S505).

In a conventional LTE system, a single carrier was configured in uplink or downlink transmission, and a PUCCH of a certain UE was configured and transmitted within the single carrier. Since the uplink transmission is performed by the UE, PAPR should be low in order to reduce battery consumption. Therefore, a modulation scheme with a single carrier feature was used.

However, in an IMT-Advanced system such as an LTE-advanced system, as a UE transmits a larger amount of control information to a base station, large payload symbols need to be simultaneously transmitted via a legacy control channel. Therefore, when the control information transmitted via a control channel or a shared channel in uplink is transmitted in a state of being joint coded, overhead can be reduced and a channel coding gain can be increased. The joint coded control information may be transmitted or received using a multiple-carrier-based transmission scheme or a transmission scheme based on a combination of a single carrier and multiple carriers, in order to perform broadband communication. The UE may be selectively operated in each carrier, or transmit or receive signals simultaneously using several carriers.

Accordingly, when a signal received by a receiver is decoded in the multiple-carrier-based transmission scheme, efforts for reducing power consumption due to the transmission of the multiple carriers without increasing decoding complexity are being made in association with the scheme.

DISCLOSURE OF INVENTION

Technical Problem

An object of the present invention devised to solve the problem lies in a method and apparatus capable of increasing decoding performance of a signal received by a receiver while minimizing power loss generated during transmission, if the signal is transmitted via multiple channels.

Technical Solution

The object of the present invention can be achieved by providing a method for transmitting signals in a wireless communication system, the method including: joint coding the signals transmitted via one or more channels; separating the joint coded signal into a plurality of signals in consideration of the number of carrier channels (component carriers) in carrier channel groups (carrier aggregation) used for transmission; allocating the separated signals to carrier channels within the carrier channel groups, respectively; and transmitting the signals allocated to the carrier channels within the carrier channel groups to a receiver.

The separated signals may be separated so as to partially overlap between adjacent separated signals within the joint coded signal. The separated signals may be separated so as not to overlap between the adjacent separated signals within the joint coded signal and may be circularly separated such that some of the separated signals include a rear end portion of the joint coded signal and a front end portion of the joint coded signal. The separated signals may be separated so as to partially overlap between the adjacent separated signals within the joint coded signal and may be circularly separated such that some of the separated signals include a rear end portion of the joint coded signal and a front end portion of the joint coded signal.

The signals transmitted via the one or more channels may be uplink control signals. The one or more channels may include at least one of a Physical Uplink Shared Channel (PUSCH), a first Physical Uplink Control Channel (PUCCH) and a second PUCCH, and a symbol space may be acquired by joint coding of symbols which are able to be transmitted via the one or more channels.

The joint coding of the symbols may include at least one of joint coding of PUSCHs, joint coding of a new PUCCH and the first PUCCH, joint coding of a new PUCCH and the second PUCCH, joint coding of the PUCCH and the first PUCCH, joint coding of the PUSCH and the second PUCCH, and joint coding of the first PUCCH and the second PUCCH.

In another aspect of the present invention, provided herein is a method for receiving signals in a wireless communication system, the method including: receiving one or more channel signals via a plurality of carrier channels (component carriers) within carrier channel groups (carrier aggregation); concatenating the signals received via the carrier channels; joint decoding the concatenated signal; and separating the joint decoded signal so as to correspond to the number of carrier channels within the carrier channel groups and processing the separated decoded signals.

The signals received via the plurality of carrier channels within the carrier channel groups may be transmitted by a transmitter in a state of being separated so as to partially overlap between adjacent signals within a joint coded signal. Alternatively, the signals received via the plurality of carrier channels within the carrier channel groups may be transmitted by a transmitter in a state of being separated so as not to overlap between adjacent signals within a joint coded signal or in a state of being circularly separated such that some of the separated signals include a rear end portion of the joint coded signal and a front end portion of the joint coded signal. Alternatively, the signals received via the plurality of carrier channels within the carrier channel groups may be transmitted by a transmitter in a state of being separated so as to partially overlap between adjacent signals within a joint coded signal or in a state of being circularly separated such that some of the separated signals include a rear end portion of the joint coded signal and a front end portion of the joint coded signal.

The one or more channel signals may be uplink control signals. The one or more channels may include at least one of a Physical Uplink Shared Channel (PUSCH), a first Physical Uplink Control Channel (PUCCH) and a second PUCCH, and a symbol space may be acquired by joint coding of symbols which are able to be transmitted via the one or more channels.

The joint coding of the symbols may include at least one of joint coding of PUSCHs, joint coding of a new PUCCH and the first PUCCH, joint coding of a new PUCCH and the second PUCCH, joint coding of the PUCCH and the first PUCCH, joint coding of the PUSCH and the second PUCCH, and joint coding of the first PUCCH and the second PUCCH.

In another aspect of the present invention, provided herein is an apparatus for transmitting a signal in a wireless communication system, the apparatus including: a concatenation module which concatenates signals of carrier channel groups in a predetermined or specific order so as to configure one piece of set information; an encoder which joint codes the signals configured as the set information; and a rate matching module which performs rate matching with respect to the coded signals by repetition or puncturing in consideration of the amount of available resources.

Advantageous Effects

According to the present invention, if signals are transmitted in a multiple-carrier scheme, it is possible to minimize power loss which may be generated during transmission. In addition, in the decoding of signals received by a receiver, it is possible to improve performance during decoding at the receiver by repeatedly transmitting some of the coded signals or circularly and repeatedly allocating insufficient signals to carrier channel groups.

In addition, it is possible to configure a single decoder for decoding signals received by the receiver.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

To prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In an IMT-Advanced system, as a multiple-carrier-based transmission scheme via multiple channels, channel aggregation may be used for allocation of a wider system bandwidth.

In a Long Term Evolution (LTE) system, uplink/downlink signal transmission may be performed using a Physical Uplink Shared Channel (PUSCH)/Physical Uplink Control Channel (PUCCH) and Physical Downlink Shared Channel (PDSCH)/Physical Downlink Control Channel (PDCCH) configured within a single carrier.

In uplink/downlink transmission of an LTE-Advanced system, signals to be transmitted via two or more data shared channels and control information channels may be configured by joint coding so as to be suitable for multiple-carrier transmission. Alternatively, in order to maintain backward compatibility with the existing system, data shared channels and control information channels configured in the single carrier may be configured in a separation coding type.

If separation coding is used in a channel aggregation state, blind decoding should be performed according to carriers in order to decode the data channels and the control information channels scheduled in multiple carriers. If blind decoding is used for downlink transmission from a base station to a User Equipment (UE), decoding complexity of the UE may be increased and power consumption may be increased Accordingly, when considering control information in the LTE-Advanced system in the transmission of a signal using joint coding, payload symbols need to be simultaneously transmitted via a legacy control channel.

The control information transmitted in uplink includes Channel Quality Information (CQI) of multiple carriers and a neighbor cell, a Rank Indicator (RI), a Precoding Matrix Index (PMI), and ACK/NACK. Such control information may become spatial channel information of a serving cell and a neighbor cell until an 8 8 antenna structure is obtained. In CoMP transmission/reception, timing/timing advance information may be reported to a neighbor cell so as to be matched to a transmission time at each transmission point. Such time information may be acquired from a Positioning Reference Symbol (PRS), a Common Reference Symbol (CRS), Channel State Information (CSI) or the like. The CQI may be replaced with the CSI, in order to determine a transmission scheme and parameters thereof.

Meanwhile, component carriers grouped in a subframe structure and subcarriers configuring each of the component carriers may be variously configured. That is, a transmission band between a transmitter and a receiver may be configured by one or more component carriers, and subcarriers or resource blocks used for transmission on each of the component carriers may be continuously or discontinuously allocated. When the transmitter or the receiver transmits data via the transmission band configured by one or more component carriers, frequency resources configured by a combination of one or more resource blocks composed of one or more subcarriers or some of subcarriers configuring each of the component carriers may be used.

Accordingly, the frequency resources used for data transmission considered in the present invention may be continuously or discontinuously configured within a certain component carrier. If the frequency resources of the component carrier are set to a transmission band, they may be understood as a set of one or more subcarriers or one or more resource blocks on all component carriers.

The symbols on a time axis may be variously understood according to transmission schemes.

Now, the common description of the embodiments of the present invention in the drawings will be given. In the present invention, a set of one or more component carriers used for physical channel transmission for data or control information in uplink/downlink transmission or individual entities thereof is called a carrier channel group.

In uplink transmission, the carrier channel group may be understood as a component which is an object to be aggregated in the concept of UE-specific carrier aggregation or cell-specific carrier aggregation. In addition, multiple channels used for transmitting a signal are on one or more carriers, and subcarriers used for certain transmission may be configured by continuously or discontinuously allocating and combining some carriers or resource blocks of one or more carrier channel groups.

One or more carrier channel groups may be configured. In the embodiments of the present invention shown in FIGS. 6 to 8, it is assumed that n carrier channel groups are present. That is, the number of carrier channel groups(n) may be a certain integer of 1 or more and may change with time.

In the embodiments of the present invention, channels used for the scheme for transmitting the signal include uplink and downlink channels. More particularly, the uplink control channel may include a PUSCH, a first PUCCH, and a second PUCCH, and a symbol space may be generated by joint coding of symbols transmitted via two or more shared channels and control channels.

In order to transmit control information, examples of joint coding of symbols between two or more channels include the following cases.

First, there is joint coding of symbols transmitted via multiple PUSCHs. The symbol space of control information may be all Resource Elements (REs) which may be used for data transmission, REs which may be used for Rel-8 UE, or REs which are additionally defined for LTE-A UE. The multiple PUSCHs may be located on the same uplink carrier or different uplink carriers.

Second, there is joint coding of symbols transmitted via the second PUCCH and a new PUCCH. The symbol space of control information may be all module symbols used for new control information transmission or the second PUCCH including data symbols on non-reference OFDM symbols, and other possible modules on reference symbols may be applied. The above-described PUCCHs may be located on the same uplink Physical Resource Block (PRB)/carrier or different uplink PRBs/carries. If the PUCCHs are located on the same PRS, an additional symbol space may be generated if the joint coding of the data symbols and the reference symbols may be redefined with respect to additional information.

Third, there is joint coding of symbols transmitted via the first PUCCH and a new PUCCH. The symbol space of control information may be a BPSL or QPSK module on a subframe which is differentially modulated or distinctly modulated, the first PUCCH including BPSK/QPSK module information which is differentially modulated and separated into slots on reference symbols or all modulated symbols used for new control information transmission. The multiple PUCCHs may be located on the same uplink PRB/carrier or different uplink PRBs/carriers. If the multiple PUCCHs are located on the same PRB, an additional symbol space may be generated if the joint coding of the data symbols and the reference symbols may be redefined with respect to additional information.

Fourth, there are joint coding of symbols transmitted via the PUSCH and the second PUCCH and joint coding of symbols transmitted via the PUSCH and the first PUSCH. The symbol space may be defined as a sum of symbol spaces of the PUSCH and the first or second PUCCCH.

Fifth, there is joint coding of symbols transmitted via the second PUCCH and the first PUCCH. The symbol space may be defined as a sum of symbol spaces of the first PUCCH and the second PUCCH.

The signal transmitted via at least two shared channels and control channels is transmitted by joint coding a signal to be transmitted via channels, separating the signal in modulated symbol units, and allocating the separated signals to carrier channel groups. Hereinafter, the scheme for separating and allocating the joint coded signal will be described.

Hereinafter, FIGS. 6 to 12 show methods for separating and allocating joint coded control information to carrier channel groups.

Figure 6:
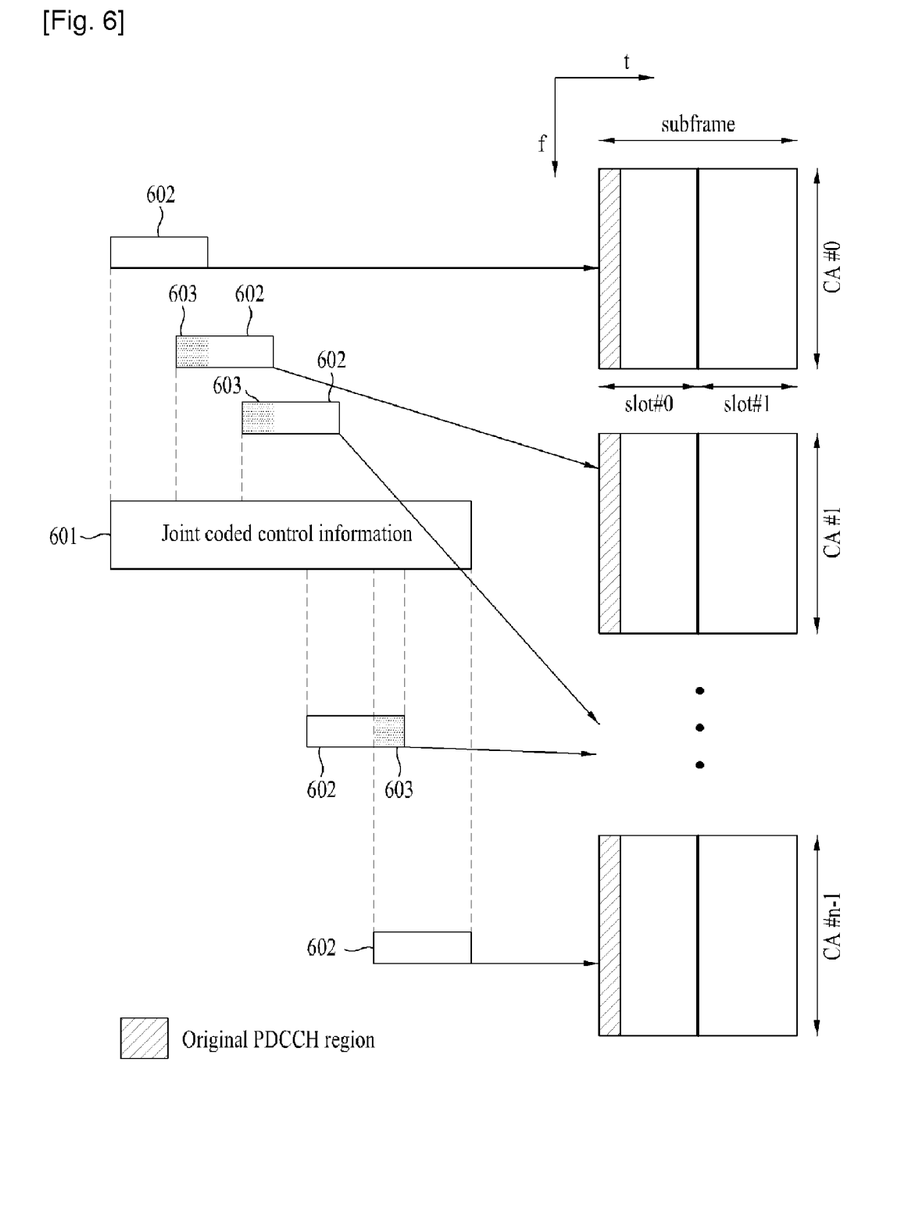
FIG. 6 is a view showing a method for transmitting signals according to carrier channel groups, in accordance with an embodiment of the present invention.

FIG. 6 is a view showing a method for transmitting signals according to carrier channel groups, in accordance with an embodiment of the present invention.

If the symbol space occupied by the joint coded signal transmitted via two or more shared channels or control channels is greater than the overall symbol space of a specific control channel, one or more signals transmitted between a transmitter and a receiver may be dispersed into a plurality of signals after joint coding and may be allocated to a plurality of carrier channel groups so as to be partially overlapped. Referring to FIG. 6, the control information 601 after coding is separated and allocated to a plurality of carrier channel groups 602 so as to be transmitted in consideration of the number of carrier channel groups used for transmission.

At this time, overlapping portions 603 between the continuous carrier channel groups may be configured while the control information is allocated to the plurality of carrier channel groups. A value obtained by subtracting the sum of control information allocated to the overlapping portions 603 between the carrier channel groups from the total sum of control information transmitted in a state of being allocated to the carrier channel groups 602 may be equal to the length of a joint coded control information bit stream 601. Accordingly, the receiver may have higher decoding performance using joint coding or the like by increasing control information to be transmitted.

For example, it is assumed that the length of the joint coded control information is 160, the number of carrier channel groups is 5, the length of the joint coded control information allocated to the carrier channel groups is 40, and the length of the control information allocated to the overlapping portions between the carrier channel groups is 10. A relationship of the number of carrier channel groups (5) the length of the joint coded control information allocated to the carrier channel groups (40) the number of overlapping portions between the carrier channel groups (4) the length of the control information allocated to the overlapping portions between the carrier channel groups (10)=the length of the joint coded control information (160) is satisfied.

The length of the joint coded control information portion allocated to the carrier channel groups may or may not be uniform. The joint coded control information may be allocated to the carrier channel groups according to a predetermined order or a specific order, and the joint coded control information may be separated according to the number of carrier channel groups used for transmitting data to the receiver.

Meanwhile, the length of the partially overlapping portions of the control information may be dynamically signaled. That is, the length of the overlapping portions between the carrier channel groups may use a specific value known to the base station and the UE, a specific value determined according to the number of scheduled carriers or the system configuration, or a specific value according to the payload size of the joint coded control channel. The control information may be changed, transmitted or updated with a specific period (e.g., 1TTI, 5TTI, 10TTI, 20TTI, 40TTI, or the like). The information about the control information transmission length may be applied to the embodiments of the present invention shown in FIGS. 7 and 8.

In addition, in the setting of the partially overlapping areas on the overall coding control information stream, the total amount of the overlapping bit stream areas may be set to an optimal value according to the system design purpose (e.g., coverage, required power (PSD), desired diversity gain margin or the like). At this time, if n carrier channel groups on the bit stream are applied, (n−1) overlapping areas may be generated. The sizes of the individually overlapping areas may be uniform, or may not be uniform based on a specific parameter such as the bandwidth of one carrier channel group.

Figure 7:
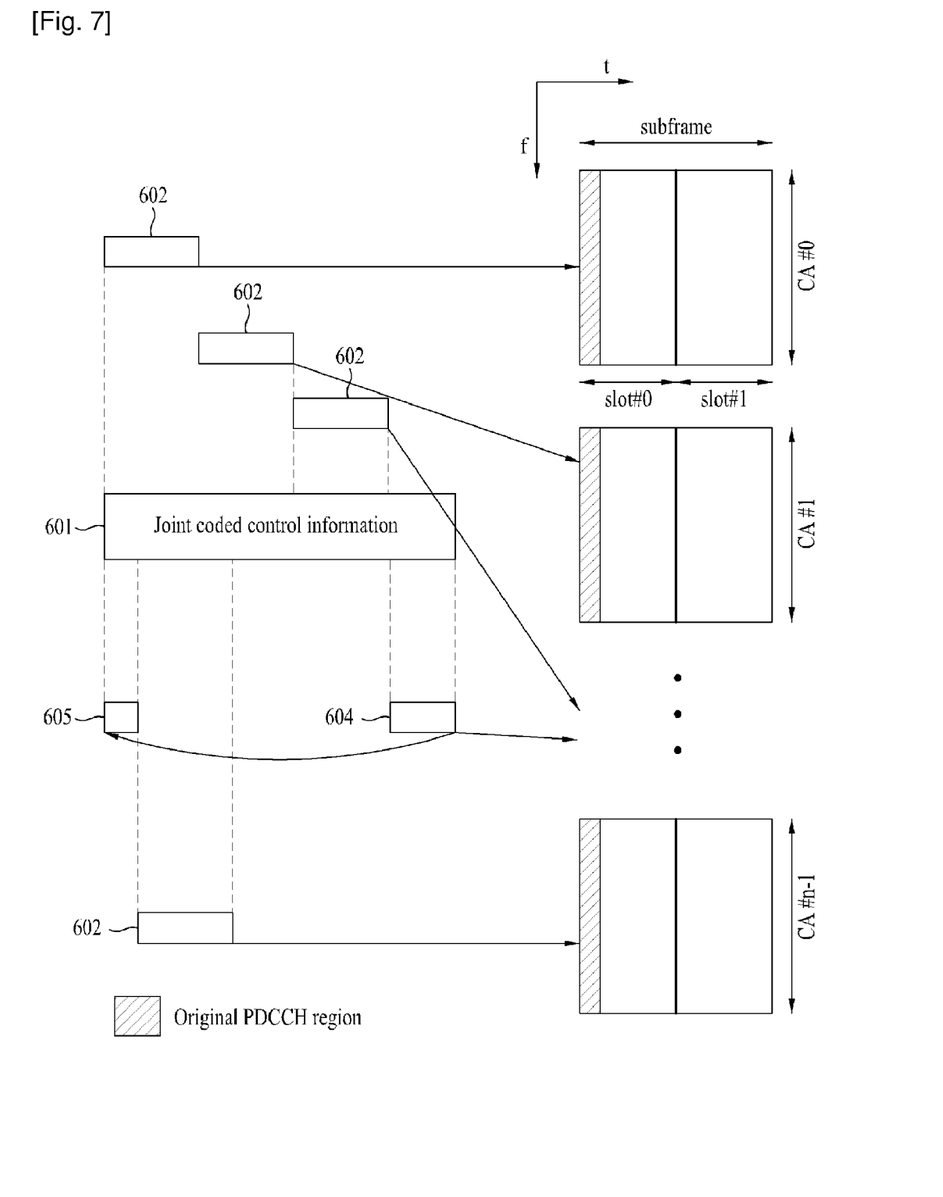
FIG. 7 is a view showing a method for transmitting signals according to carrier channel groups, in accordance with another embodiment of the invention.

FIG. 7 is a view showing a method for transmitting signals according to carrier channel groups, in accordance with another embodiment of the invention.

Even if the symbol space occupied by the joint coded signal transmitted via two or more shared channels or control channels is less than the overall symbol space of a specific control channel, one or more pieces of control information transmitted between a transmitter and a receiver may be dispersed into plural pieces of control information after joint coding and may be allocated to a plurality of carrier channel groups. Referring to FIG. 7, the control information 601 after coding is separated and allocated to a plurality of carrier channel groups 602 so as to be transmitted in consideration of the number of carrier channel groups used for transmission.

At this time, the carrier channel groups 602 do not overlap with each other. If the length of the joint coded control information 601 is less than the total length of all the carrier channel groups 602, the control information is allocated to a last carrier channel group 604 of the carrier channel groups, and a first portion of the control information is allocated to a next carrier channel group 605. In this case, the control information may be circularly allocated to the carrier channel groups.

For example, if it is assumed that the total length of the joint coded control information is 100, the number of used carriers is 5, and the length of the control information allocated according to the carrier channel groups is 40, the carrier channel groups remain even when all control information is allocated to the carrier channel groups. Accordingly, among the five carrier channel groups, the control information with a length of 40 is sequentially allocated to a first carrier channel group and a second carrier channel group, the remaining control information with a length of 20 is allocated to a third carrier channel group, a front portion of the control information with a length of 20 is allocated to a fourth channel group, and the control information with a length of 40 is sequentially allocated to the subsequent carrier channel groups.

The length of the joint coded control information portion allocated to the carrier channel groups may be uniform or may not be uniform. The joint coded control information may be allocated to the carrier channel groups according to a predetermined order or a specific order, and the joint coded control information may be separated according to the number of carrier channel groups used for transmitting data to the receiver.

In the above-described embodiment, the circular allocation of the control information serves to provide a method for allocating more power for transmission with a specific code rate. At this time, the circular allocation amount may be specified by a required SNR, Eb/No or transmission power value calculated based on factors such as the bandwidth or coverage of the system.

Figure 8:
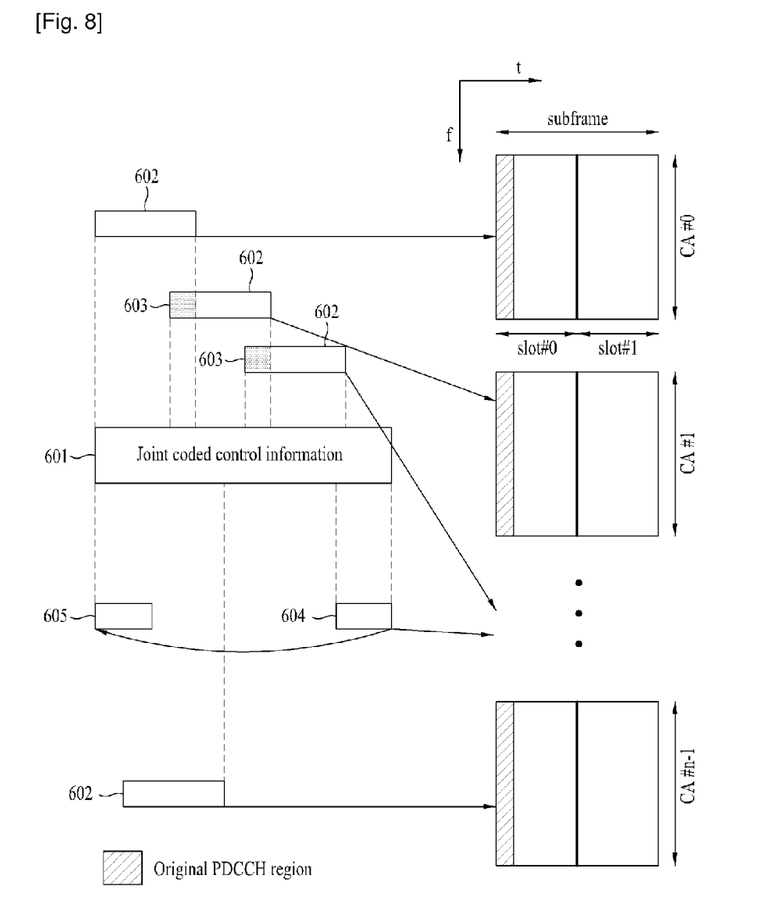
FIG. 8 is a view showing a method for transmitting signals according to carrier channel groups, in accordance with another embodiment of the invention.

FIG. 8 is a view showing a method for transmitting signals according to carrier channel groups, in accordance with another embodiment of the invention.

If the symbol space occupied by the joint coded signal transmitted via two or more shared channels or control channels is less than the overall symbol space of a specific control channel, one or more pieces of control information transmitted between a transmitter and a receiver may be dispersed into plural pieces of control information after joint coding and may be allocated to a plurality of carrier channel groups so as to be partially overlapped. Referring to FIG. 8, the control information 601 after coding is separated and allocated to a plurality of carrier channel groups 602 so as to be transmitted in consideration of the number of carrier channel groups used for transmission, and the portions allocated to the carrier channel groups may be configured such that some overlapping portions 603 are generated as shown in FIG. 6. Since the length of the joint coded control information 601 is less than the total length of all the carrier channel groups 602, the first portion of the control information may be circularly allocated as shown in FIG. 7. That is, the control information may be allocated to a last carrier channel group 604 of the carrier channel groups and the first portion of the control information may be allocated to a next carrier channel group 605. That is, the control information may be circularly allocated to the carrier channel groups. Accordingly, the present embodiment has both the features of FIGS. 6 and 7.

Similarly, the length of the joint coded control information portion allocated to the carrier channel groups may or may not be uniform. The joint coded control information may be allocated to the carrier channel groups according to a predetermined order or a specific order, and the joint coded control information may be separated according to the number of carrier channel groups used for transmitting data to the receiver.

When the joint coded control information channel is transmitted in a state of being respectively separated and allocated to the carriers in the embodiments shown in FIGS. 6 to 8, it is preferable that the control information be separated in the form of at least a multiple of REG (nREG), for backward compatibility within a single carrier.

Although the method for separating and allocating the coded control information to the carrier channel groups is described in the embodiments of the present invention, the present invention is efficiently applied to a case where different modulation methods may be used according to carrier channel groups. Alternatively, if a common modulation method is applied according to carrier channel groups, the coded control information stream may be modulated and the modulated symbol stream may then be separated and allocated to carrier channel groups. The above-described method for allocating the coded control information to the carrier channel groups may be conceptually applied to the modulated symbol stream.

Next, a case where the method for transmitting the signal using the carrier channel groups according to the present invention is applied to a mobile communication system will be described with reference to FIGS. 9 to 12.

Figure 9:
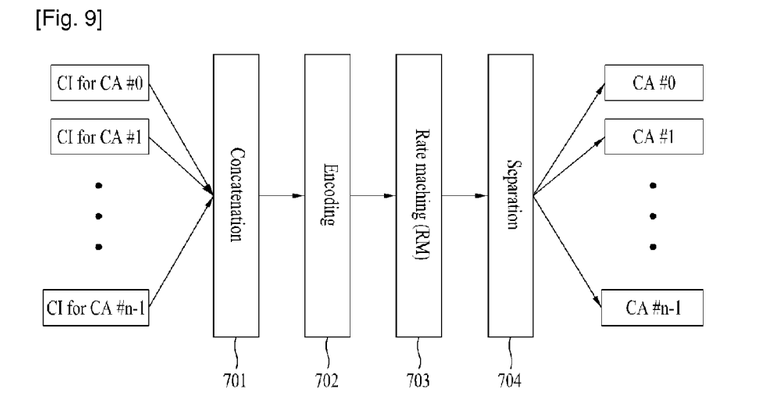
FIG. 9 is a view showing a procedure for allocating control information to a plurality of carrier channel groups at a transmitter, in accordance with an embodiment of the present invention.

FIG. 9 is a view showing a procedure for allocating control information to a plurality of carrier channel groups at a transmitter, in accordance with an embodiment of the present invention.

The control information transmitted via two or more shared channels or control channels is concatenated in a predetermined or specific order so as to configure one piece of information by a concatenation module (701), and is encoded by an encoder (702). As the encoder, different encoders or one encoder may be used according to the length of concatenated information, and a code rate may be used in consideration of the amount of available resources. Next, the information is input to a rate matching module (703). In the rate matching, a rate may be matched by repetition or puncturing in consideration of the amount of available resources. The coded control information which is subjected to the rate matching is separated so as to be allocated to the carrier channel groups (704), and may be uniformly or non-uniformly allocated to the carrier channel groups in a predetermined or specific order.

Figure 10:
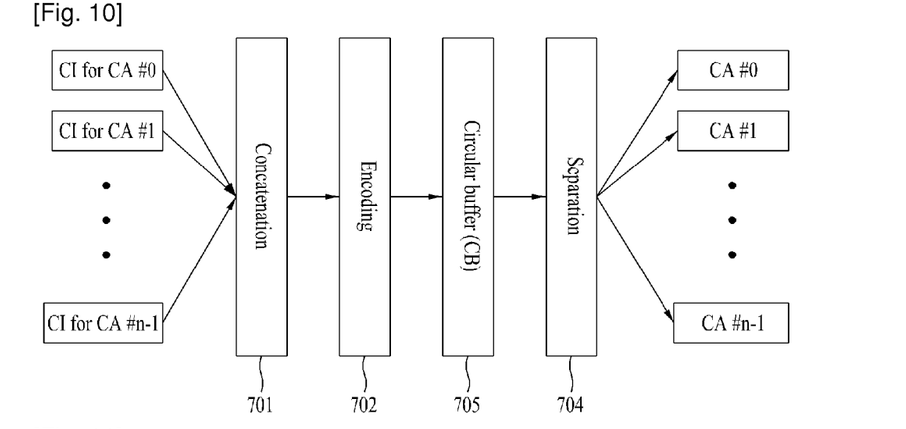
FIG. 10 is a view showing a procedure for allocating control information to a plurality of carrier channel groups at a transmitter, in accordance with another embodiment of the present invention.

FIG. 10 is a view showing a procedure for allocating control information to a plurality of carrier channel groups at a transmitter, in accordance with another embodiment of the present invention.

The control information transmitted via two or more shared channels or control channels is concatenated in a predetermined or specific order so as to configure one piece of information by a concatenation module (701), and is encoded by an encoder (702). As the encoder, different encoders or one encoder may be used according to the length of concatenated information, and a code rate may be used in consideration of the amount of available resources. Next, the information is input to a circular buffer supporting a function for performing repeated transmission in consideration of the length of a carrier to be used next (705). The coded control information is separated so as to be allocated to the carrier channel groups (704), and may be uniformly or non-uniformly allocated to the carrier channel groups in a predetermined or specific order.

Figure 11:
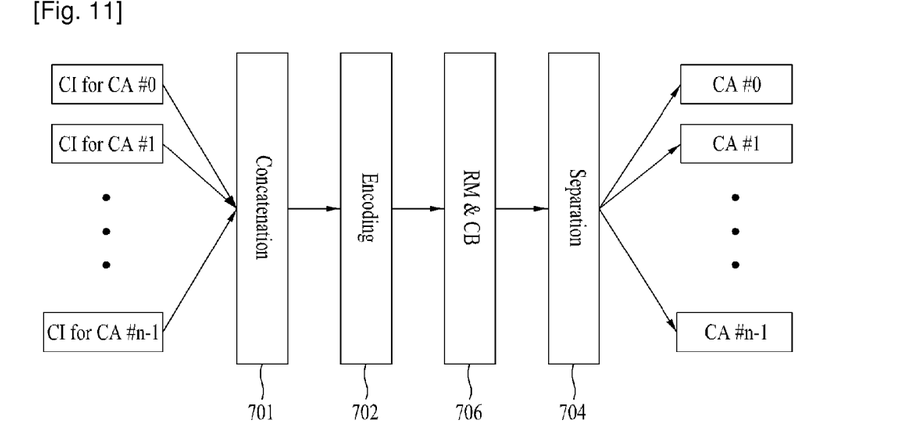
FIG. 11 is a view showing a procedure for allocating control information to a plurality of carrier channel groups at a transmitter, in accordance with another embodiment of the present invention.

FIG. 11 is a view showing a procedure for allocating control information to a plurality of carrier channel groups at a transmitter, in accordance with another embodiment of the present invention.

The control information transmitted via two or more shared channels or control channels is concatenated in a predetermined or specific order so as to configure one piece of information by a concatenation module (701), and is encoded by an encoder (702). As the encoder, different encoders or one encoder may be used according to the length of concatenated information, and a code rate may be used in consideration of the amount of available resources. Next, the information is input to a rate matching (RM) module for matching a rate by repetition or puncturing in consideration of the length of a carrier to be used next and a circular buffer (CB) for supporting a function for performing repeated transmission in consideration of the amount of available resources (706). The coded control information is separated so as to be allocated to the carrier channel groups (704), and may be uniformly or non-uniformly allocated to the carrier channel groups in a predetermined or specific order.

In the method for allocating the control information to the carrier channel groups in the transmitter, which is shown in FIGS. 9 to 11, the rate matching process 703, the circular buffer 705 or the rate matching and circular buffer (706) may be omitted.

Figure 12:
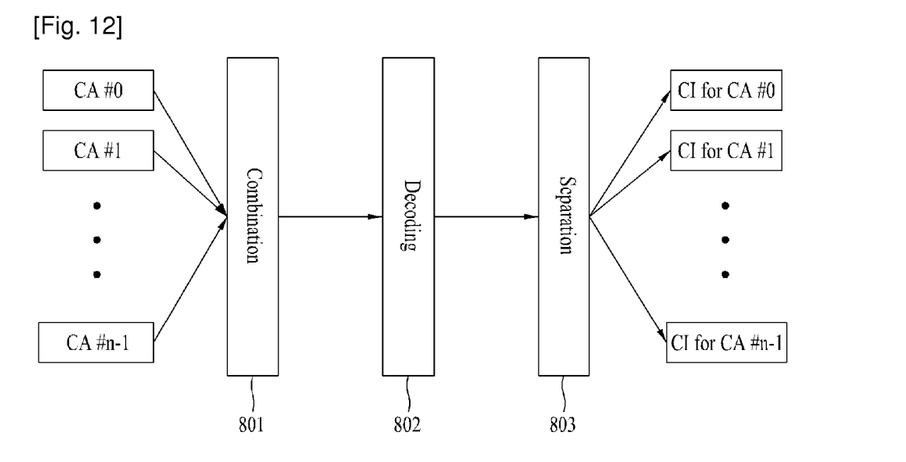
FIG. 12 is a view showing a procedure for decoding control information of carrier channel groups at a receiver, in accordance with the present invention.

Next, FIG. 12 is a view showing a procedure for decoding control information of carrier channel groups at a receiver, in accordance with the present invention.

Referring to FIG. 12, the receiver receives coded control information transmitted in a state of being allocated to carrier channel groups from a transmitter. The received control information is concatenated by a concatenation module and is converted into a series of streams for decoding using the inverse function of rate matching or circular buffer (801). After decoding (802), the control information corresponding to the carrier channel groups is separated by a separation module and is provided to the receiver (803).

The embodiments of the present invention describe the method for allocating joint coded control information bit stream for control information transmission or a modulated symbol stream thereof to the carrier channel groups, and may be also applied to data transmission.

The symbol space according to the present invention is defined with respect to a Multiple-Input Multiple-Output (MIMO) antenna system, a symbol space in a spatial multiplexing scheme may be double or quadruple that in the case where a single antenna is used. In addition, the antennas may have different PUCCH resources and PUSCH resources which may be defined in the same or different PRBs of same or different carriers. If the symbol space defined as described above is used, the uplink control information may be mapped according to the coded control information which may become the above-described joint coded control information or the separated control information. In spite of the separated coded control information or the joint coded control information, the control information may be simultaneously transmitted by a single transmission unit.

In this case, multiple control channels do not need to be used, and the allocation of resources to specific uplink control channel feedback may be dynamically signaled by an L1/L2 control signal (as in a PDCCH or MAC message) or high layer signaling.

Joint coding of specific control channel information or control information may be simply triggered by a single triggering bit or multiple triggering bits (with respect to multiple carriers, multiple cells, multiple subframes or multiple control information of various multiple control reference symbols). In case of a multiple triggering bit indicator, the bits may be analyzed as triggering signals which are distinguished with respect to control information types, downlink/uplink carriers or specific cells.

In another triggering method, parameters include a carrier index of UE-specific carrier aggregation or recognition domain, a cell index of a cell set which is specifically set, a subframe index of a specific subframe having specific features such as a beamforming pattern, a precoding pattern or a reference symbol type/pattern.

Mode for the Invention

Various embodiments have been described in the best mode for carrying out the invention.

It will be apparent to those skilled in the art that various modifications and variations can be made in the present invention without departing from the spirit or scope of the invention. Accordingly, the above detailed description is intended to be illustrative rather than restrictive. The invention is defined by the appended claims, and all changes to the invention that fall within the meaning and range of equivalency of the claims are to be embraced within their scope. It will be apparent that embodiments may be configured by combining claims without an explicit relationship therebetween or new claims may be added by amendment after application.

INDUSTRIAL APPLICABILITY

The exemplary embodiments of the present invention are applicable to various wireless access systems. For example, the wireless access systems are a 3GPP system, a 3GPP2 system, and/or an IEEE 802.xx system. Besides the wireless access systems, the exemplary embodiments of the present invention are applicable to all technical fields in which the wireless access systems find their applications.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for transmitting signals at a transmitter in a wireless communication system, the method comprising:
joint coding the signals transmitted via one or more channels;
separating the joint coded signal into a plurality of signals in consideration of a number of component carriers in carrier aggregation used for transmission;
allocating the separated signals to each of the component carriers within the carrier aggregation, respectively; and
transmitting the allocated signals to a receiver.

2. The method according to claim 1, wherein the separated signals are separated so as to partially overlap between adjacent separated signals within the joint coded signal.

3. The method according to claim 1, wherein the separated signals are separated so as not to overlap between the adjacent separated signals within the joint coded signal, and are circularly separated such that some of the separated signals include a rear end portion of the joint coded signal and a front end portion of the joint coded signal.

4. The method according to claim 1, wherein the separated signals are separated so as to partially overlap between the adjacent separated signals within the joint coded signal, and are circularly separated such that some of the separated signals include a rear end portion of the joint coded signal and a front end portion of the joint coded signal.

5. The method according to claim 1, wherein the signals transmitted via the one or more channels are uplink control signals.

6. The method according to claim 1, wherein the one or more channels include at least one of a Physical Uplink Shared Channel (PUSCH), a first Physical Uplink Control Channel (PUCCH) and a second PUCCH, and wherein a symbol space is acquired by joint coding of symbols which are able to be transmitted via the one or more channels.

7. The method according to claim 6, wherein the joint coding of the symbols includes at least one of joint coding of PUSCHs, joint coding of a new PUCCH and the first PUCCH, joint coding of a new PUCCH and the second PUCCH, joint coding of the PUSCH and the first PUCCH, joint coding of the PUSCH and the second PUCCH, and joint coding of the first PUCCH and the second PUCCH.

8. A method for receiving signals in a wireless communication system, the method comprising:
receiving one or more signals via a plurality of component carriers within carrier aggregation, respectively;
concatenating the signals received via the component carriers;
joint decoding the concatenated signal;
separating the joint decoded signal so as to correspond to a number of component carriers; and
processing the separated signals.

9. The method according to claim 8, wherein the signals received via the component carriers are transmitted by a transmitter in a state of being separated so as to partially overlap between adjacent signals within a joint coded signal.

10. The method according to claim 8, wherein the signals received via the component carriers are transmitted by a transmitter in a state of being separated so as not to overlap between adjacent signals within a joint coded signal and in a state of being circularly separated such that some of the separated signals includes a rear end portion of the joint coded signal and a front end portion of the joint coded signal.

11. The method according to claim 8, wherein the signals received via the component carriers are transmitted by a transmitter in a state of being separated so as to partially overlap between adjacent signals within a joint coded signal or in a state of being circularly separated such that some of the separated signals includes a rear end portion of the joint coded signal and a front end portion of the joint coded signal.

12. The method according to claim 8, wherein the one or more signals are uplink control signals.

13. The method according to claim 8, wherein the signals are transmitted via one or more channels, and
the one or more channels include at least one of a Physical Uplink Shared Channel (PUSCH), a first Physical Uplink Control Channel (PUCCH) and a second PUCCH, and
a symbol space is acquired by joint coding of symbols which are able to be transmitted via the one or more channels.

14. The method according to claim 13, wherein the joint coding of the symbols includes at least one of joint coding of PUSCHs, joint coding of a new PUCCH and the first PUCCH, joint coding of a new PUCCH and the second PUCCH, joint coding of the PUCCH and the first PUCCH, joint coding of the PUSCH and the second PUCCH, and joint coding of the first PUCCH and the second PUCCH.

15. An apparatus for transmitting a signal in a wireless communication system, the apparatus comprising:
a concatenation module which concatenates signals of carrier aggregation in a predetermined or specific order so as to configure one piece of set information;
an encoder which joint codes the signals configured as the set information; and
a rate matching module which performs rate matching with respect to the coded signals by repetition or puncturing in consideration of the amount of available resources.

* * * * *